United States Patent [19]

Schrader

[11] 4,057,475
[45] Nov. 8, 1977

[54] METHOD OF FORMING A PLURALITY OF ARTICLES

[75] Inventor: Gustav E. Schrader, Pepper Pike, Ohio

[73] Assignee: TRW Inc., Cleveland, Ohio

[21] Appl. No.: 700,542

[22] Filed: June 28, 1976

[51] Int. Cl.$^2$ .......................... C25F 3/00; B23P 1/04; B23P 1/12
[52] U.S. Cl. .............................. 204/129.1; 204/129.5; 204/129.55; 204/224 M
[58] Field of Search ............. 204/129.1, 129.5, 129.55, 204/224 M, 225

[56] References Cited

U.S. PATENT DOCUMENTS

| 3,459,645 | 8/1969 | Wilson et al. | 204/129.5 X |
| 3,554,892 | 1/1971 | Schellens et al. | 204/224 M |
| 3,753,890 | 8/1973 | Koppern et al. | 204/224 M |
| 3,803,009 | 4/1974 | Kawafune et al. | 204/224 M X |

FOREIGN PATENT DOCUMENTS

| 1,218,546 | 1/1971 | United Kingdom | 204/224 M |

Primary Examiner—T. Tung
Assistant Examiner—D. R. Valentine

[57] ABSTRACT

An improved method of forming articles, such as airfoils, includes forming the major side surfaces of a plurality of airfoils in two groups or series along opposite edge portions of a workpiece by utilizing a plurality of pairs of electrodes to effect the electrolytic removal of material from opposite sides of the workpiece. Leading and trailing edge portions of the airfoils are formed by utilizing a plurality of relatively long narrow electrodes to effect the electrolytic removal of material to form slots between the major side surfaces of the airfoils and the remaining portion of the workpiece. During the electrolytic removal of material to form both the major side surfaces and the slots at the leading and trailing edge portions of the airfoils, an electrical potential is established beteen the electrodes and the workpiece and a flow of electrolyte is maintained between the electrodes and the workpiece. After the workpiece has been inspected, a base is formed in association with each of the airfoils. This is accomplished by utilizing a pair of cutting tools to simultaneously form grooves along opposite sides of the workpiece between the two series of airfoils. After the grooves have been formed, the two series of airfoils are separated from each other and cutting tools are utilized to complete the formation of the bases in association with the airfoils. As this is being accomplished, the various airfoils and their associated bases are separated from each other. The tip end portions of the airfoils are then finished by an electrochemical grinding operation.

28 Claims, 13 Drawing Figures

METHOD OF FORMING A PLURALITY OF ARTICLES

BACKGROUND OF THE INVENTION

This invention relates to a new and improved method which is utilized to form airfoils or other articles.

Machines have been utilized to form airfoils by the electrolytic removal of material from a workpiece. One of these machines is disclosed in U.S. Pat. No. 3,554,892. The machine disclosed in this patent utilizes a pair of cathode electrodes to form turbine blades or airfoils one at a time in an elongated workpiece. The workpiece is then severed into a plurality of segments and bases are formed in association with the airfoils in the manner disclosed in U.S. Pat. No. 3,314,137.

Another apparatus for forming airfoils or other articles is disclosed in U.S. patent application Ser. No. 681,779, filed Apr. 30, 1976 by Gustav E. Schrader and entitled "Apparatus for Electrochemically Forming a Plurality of Articles". The machine disclosed in the Schrader application utilizes a plurality of pairs of electrodes to effect the electrolytic removal of material from opposite sides of a workpiece at a plurality of spaced apart locations to form side surfaces of a first series of airfoils along one edge portion of the workpiece and side surfaces of a second series of airfoils along the opposite edge portion of the workpiece.

Machines for sequentially operating on a plurality of workpieces to form airfoils by electrolytically removing material have been devised. Machines in which material is removed from a workpiece at each of a series of work stations in turn by electrochemical operations to form airfoils are disclosed in U.S. Pat. Nos. 3,459,645 and 3,466,235. Other known prior art devices which utilize a plurality of electrodes to electrolytically remove material from a workpiece are disclosed in U.S. Pat. Nos. 3,594,298; 3,547,797; 3,436,311 and 3,287,245.

In prior art machines which are utilized to form airfoils, electrolyte has been directed between the leading and trailing edge portions of the airfoil and electrode in the manner disclosed in U.S. Pat. No. 3,372,099. In addition, it has been suggested that an electrode could be moved axially along an airfoil and the flow of electrolyte conducted along the surface of the airfoil to form the leading and trailing edge portions of the airfoil in the manner disclosed in U.S. Pat. No. 3,803,099.

SUMMARY OF THE PRESENT INVENTION

The present invention provides an improved method of forming articles, such as airfoils. Although major side surfaces of the airfoils or other articles could be formed in many different ways, the apparatus disclosed in U.S. patent application Ser. No. 681,779, filed Apr. 30, 1976, by Gustav E. Schrader and entitled "Apparatus for Electrochemically Forming A Plurality of Articles" may advantageously be utilized to electrolytically remove material from a workpiece to form the major side surfaces of a first series of airfoils along one edge portion of the workpiece and to form the major side surfaces of a second series of airfoils along the opposite edge portion of the workpiece.

In accordance with one of the features of the present invention, leading and trailing edge portions of each of the airfoils are formed by making slots between the major side surfaces of the airfoils and the remainder of the workpiece. The slots are advantageously formed by electrolytically removing material from the workpiece. This is accomplished by utilizing electrodes to shape the leading and trailing edge portions of the airfoils. However, under certain circumstances it may be desireable to use other methods to shape the leading and trailing edge portions of the airfoils.

Bases for supporting the airfoils of each of the two series of airfoils may be formed adjacent to end portions of the airfoils by utilizing cutting tools. A pair of cutting tools are advantageously moved along opposite sides of the workpiece to form a plurality of grooves between the two series of airfoils. The grooves have a shape corresponding to the shape of base surfaces which extend transversely to the leading and trailing edges of the airfoils. The two series of airfoils are then separated from each other and cutting tools are utilized to separate the various airfoils from each other and to complete the formation of the bases of the airfoils.

It should be understood that although the present invention is particularly well adapted to the formation of airfoils having bases to support the airfoils, the present invention could be utilized to form airfoils which do not have associated bases. In fact, the present invention could be practiced in the formation of many different types of articles other than airfoils. Although the major side surfaces of the airfoils are advantageously formed by effecting the electrolytic removal of material from a workpiece, certain aspects of the present invention can be practiced in association with airfoils having major side surfaces formed in other ways.

Accordingly, it is an object of this invention to provide a new and improved method for partially forming a plurality of articles and wherein the method includes the steps of partially forming two series of articles in a workpiece by effecting an electrolytic removal of material from the workpiece, separating one series of articles from the other at a central portion of the workpiece, and further forming the two series of articles after performing the step of separating them.

Another object of this invention is to provide a new and improved method of at least partially forming a plurality of airfoils having opposing major sides with leading and trailing edge portions and at least partially forming a plurality of bases which are disposed at end portions of the airfoils and wherein the method includes the steps of forming the major side surfaces of the airfoils at spaced apart locations in a workpiece with the opposite end portions of the airfoils in spaced apart linear arrays, at least partially forming leading and trailing edge portions of the airfoils by forming a plurality of slots extending transversely to the linear array of airfoil end portions, and moving a cutting tool along a path extending parallel to one of the linear arrays of airfoil end portions to at least partially form a plurality of bases adjacent to the end portions of the airfoils.

Another object of this invention is to provide a new and improved method of forming an airfoil having opposing major sides with leading and trailing edge portions and wherein the method includes the step of at least partially forming the leading and trailing edge portions of the airfoil by forming slots to separate the major sides of the airfoil from a remaining portion of a workpiece, the step of forming the slots including the step of effecting the electrolytic removal of material from the workpiece by utilizing elongated slot forming electrodes.

Another object of this invention is to provide a new and improved method of at least partially forming a plurality of airfoils and of at least partially forming a plurality of bases which are disposed at end portions of the airfoils and wherein the method includes forming major sides of first and second series of airfoils along edge portions of a workpiece, separating the first series of airfoils from the second series of airfoils, at least partially forming a plurality of bases in association with the first and second series of airfoils, at least partially forming a plurality of bases in association with the first and second series of airfoils by utilizing a cutting tool to remove material from the workpiece, and at least partially forming leading and trailing edge portions of the first and second series of airfoils by forming a plurality of slots in the workpiece.

BRIEF DESCRIPTION OF THE DRAWINGS

The foregoing and other objects and features of the invention will become more apparent upon a consideration of the following description taken in connection with the accompanying drawings wherein.

DESCRIPTION OF ONE SPECIFIC PREFERRED EMBODIMENT OF THE INVENTION

Although the present invention can be advantageously utilized in the formation of many different types of articles, it is particularly advantageous for the formation of airfoils and will be described herein in connection therewith. The formation of a plurality of airfoils is initiated by a machine 20 (FIG. 1) which is operable to electrolytically remove metal from a steel workpiece 22 to form major sides of a plurality of airfoils at spaced apart locations in the workpiece. The construction of the machine 20 and the manner in which the major sides of the airfoils are formed is the same as is disclosed in U.S. patent application Ser. No. 681,779, filed Apr. 30, 1976 by Gustav E. Schrader and entitled "Apparatus for Electrochemically Forming A Plurality of Articles".

Figure 2:
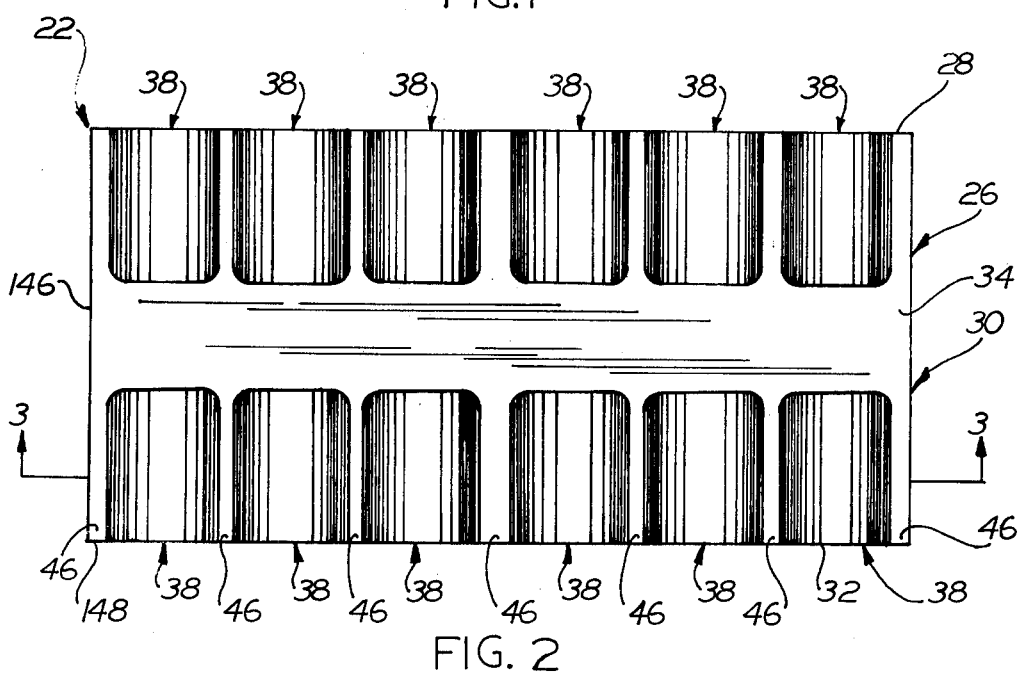
FIG. 2 is a plan view (on an enlarged scale) of a workpiece in which major side surfaces of a plurality of airfoils have been formed by utilizing the machine of FIG. 1.

The machine 20 forms a first series 26 (FIG. 2) of airfoils along a first edge portion 28 of the workpiece 22. The machine 20 also forms a second series of airfoils 30 along the opposite or second edge portion 32 of the workpiece. The two series of airfoils 26 and 30 are separated from each other by a central portion 34 of the workpiece in which bases are eventually formed in association with the airfoils.

Figure 3:
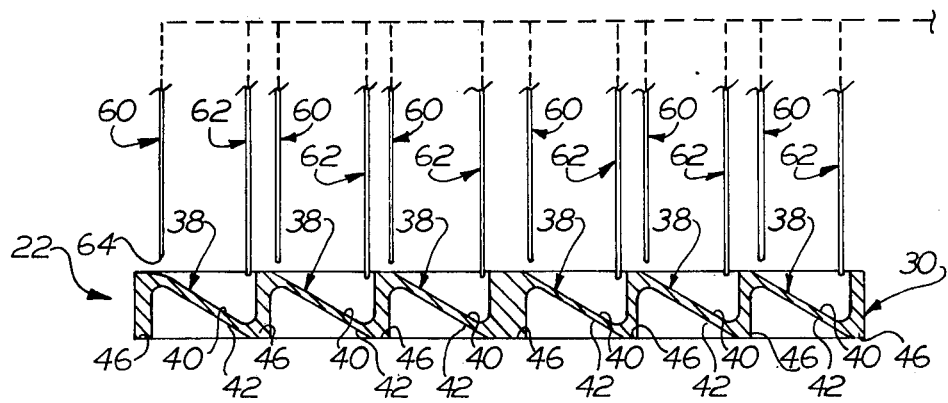
FIG. 3 is a sectional view taken generally along the line 3—3 of FIG. 2 illustrating the relationship between the workpiece and a plurality of enlongated slot forming electrodes utilized to form the leading and trailing edge portions of the airfoils.

The series of airfoils 30 includes a plurality of airfoils 38 (see FIG. 3) having opposite major side surfaces 40 and 42 which may have a twisted configuration. The identical airfoils 38 are connected with arms or ribs 46 which extend outwardly from the central portion 34 (see FIG. 2) of the workpiece in a direction generally parallel to each other and perpendicular to the edge portion 32 of the workpiece. Although the configuration of only the airfoils 38 of the series of airfoils 30 is illustrated in FIG. 3, it should be understood that the airfoils 38 of the series of airfoils 26 are of an identical construction to the airfoils of the series of airfoils 30. However, it should be noted that the airfoils of the series 26 of airfoils have major side surfaces which slope in the opposite direction from the slope of the major side surfaces of the airfoils 38 of the series of airfoils 30. If desired the two series 26 and 30 of airfoils could have different configurations.

Figure 1:
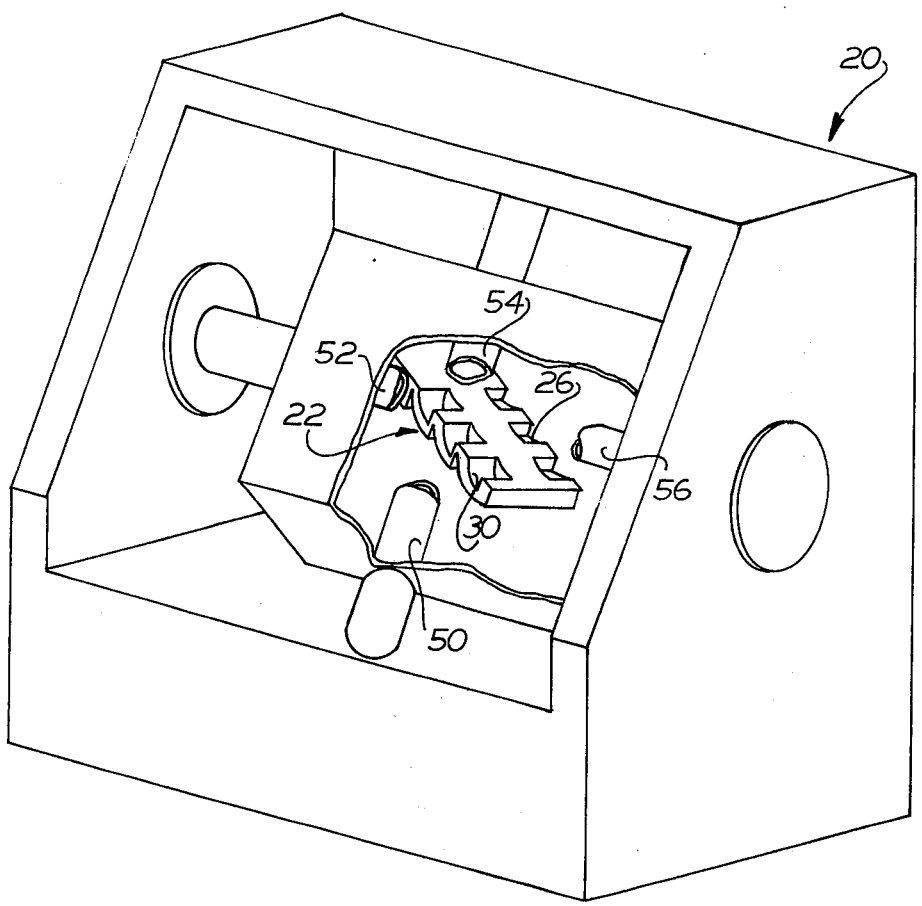
FIG. 1 is a schematic illustration of a machine for effecting the electrolytic removal of material from a workpiece to form a plurality of articles, such as airfoils.

To effect the simultaneous formation of the two series of airfoils 26 and 30, the machine 20 is provided with four electrodes which are illustrated schematically at 50, 52, 54 and 56 in FIG. 1. A first pair of electrodes 50 and 52 is utilized to partially form the series of airfoils 30 along one edge portion of the workpiece 22 simultaneously with the partial formation of the second series 26 of airfoils along the opposite edge portion of the workpiece by a second pair of electrodes 54 and 56. During the formation of the two series 26 and 30 of airfoils by the electrodes 50, 52, 54 and 56, the electrodes are moved toward the workpiece 22 while a flow of electrolyte is established between the leading end portions of the electrodes and the workpiece. At this time an electrical potential is established between the electrodes and the workpiece with the electrodes 50, 52, 54 and 56 being cathodic and the workpiece 22 being anodic to thereby effect the electrolytic removal of material from the workpiece as the electrodes are moved relative to the workpiece.

One of the electrodes of each pair of electrodes has a plurality of operating surfaces with configurations corresponding to the configuration of lower (as viewed in FIG. 3) major side surfaces 42 of the airfoils 38. The other electrode of each pair of electrodes has a plurality of operating surfaces with configuration corresponding to the configurations of the upper major side surface 40 of the airfoils 38. Thus, in the case of the pair of electrodes 50 and 52, the electrode 50 is provided with three spaced apart operating surfaces. Each of the three operating surfaces has a configuration corresponding to the configuration of a lower side surface 42 of an airfoil 38. The electrode 52 also has three spaced apart operating surfaces. Each of these operating surfaces have a configuration corresponding to the configuration of the upper major side surfaces 40 of the airfoils 38. While the electrodes 50 and 52 are forming three of the airfoils of the series 30 of airfoils, the pair of electrodes 54 and 56 are cooperating to form three of the airfoils 38 of the series 26 of airfoils.

After three airfoils 38 of each series 26 and 30 of airfoils have been formed by the electrodes 50, 52, 54 and 56, the workpiece 22 is inverted in the machine 20. Due to the inverting of the workpiece 22 in the machine 20, the pair of electrodes 50 and 52 are utilized to complete the series 26 of airfoils and the pair of electrodes 54 and 56 are utilized to complete the series 30 of airfoils. It should be noted that the workpiece 22 is positioned in the working chamber by engaging the same reference surfaces to provide for accurate positioning of the workpiece during the formation of both the initial three airfoils of each of the series 26 and 30 of airfoils and the final three airfoils of each of the series of airfoils. The manner in which the electrodes 50, 52, 54 and 56 are constructed is the same as disclosed in the aforementioned Schrader application entitled "Apparatus for Electrochemically Forming A Plurality of Articles" and will not be further described herein to avoid prolixity of description. However, it should be understood that the number of airfoils formed by each pair of electrodes 50, 52, 54 and 56 could be greater or less than three and that each series of airfoils 26 and 30 could contain either more or less than six airfoils.

The ECM apparatus 20 forms the airfoils 38 with the major side surfaces 40 and 42 connected with the ribs 46 (see FIG. 3). To form the leading and trailing edge portions of the airfoils, it is necessary to separate the major side surfaces 40 and 42 from the ribs 46. This may be accomplished by utilizing a plurality of longitudinally extending slot forming electrodes 60 and 62. The electrodes 60 are utilized to form the leading edge portions of the airfoils 38 and the electrodes 62 are utilized to form the trailing edge portions of the airfoils.

Figure 4:
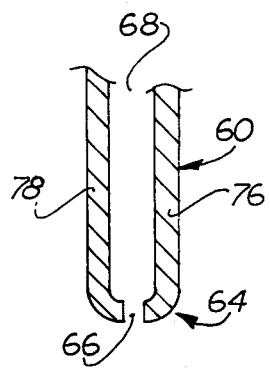
FIG. 4 is an enlarged sectional view illustrating the construction of a portion of one of the electrodes of FIG. 3.

The electrodes 60 all have the same configuration which corresponds to the configuration of the leading edge portions of the airfoils 38. Similarly, the electrodes 62 all have the same configuration which corresponds to the configuration of the trailing edge portions of the airfoils 38. The electrodes 60 have long narrow leading ends 64 (see FIG. 4) in which openings 66 are formed to enable electrolyte under pressure to flow from cavities 68 within the electrodes out through the openings 66 between the leading ends 64 of the electrodes 60 and the workpiece 22 as the electrodes 60 are moved toward the workpiece. At this time an electrical potential is established between the electrodes 60 and the workpiece with the electrodes 60 being cathodic and the workpiece anodic. This results in the electrolytic removal of material from the workpiece to form slots 72 (FIG. 7) disposed between the leading edge portions of the airfoil and the associated ribs 46. The slots 72 extend from open ends at the minor side surface 32 of the workpiece to closed end portions adjacent the roots of the airfoils 38.

To provide for the formation of the longitudinally extending slots 72, the electrodes 60 have a pair of generally flat parallel side walls 76 and 78 of a length corresponding to the distance between an outer or tip end portion 82 (see FIG. 7) of an airfoil 38 and an inner or root end portion 84 of an airfoil. Thus, as the electrodes 60 are simultaneously moved downward (as viewed in FIG. 3) slots 72 are formed between the ribs 46 and the airfoils 38 to form a leading edge portion 88 of the airfoil.

The slots 72 between the leading edge portions 88 of the airfoils 38 and the ribs 46 extend generally perpendicular to the side surface 32 of the workpiece 22 and to the central axis of the workpiece. Of course, the airfoils 38 could have edge portions with a configuration other than the illustrated configuration with a resulting change in the configuration of the slots 72. The outer end portions 82 of the airfoils 38 are disposed in a linear array which extends parallel to the central axis of the workpiece and to a linear array of the inner end portions 84 of the airfoils 38. In the specific case of the workpiece illustrated in FIG. 7, the end portions 82 of the airfoils are straight and extend parallel to the end portions 84 of the airfoils. However, it is contemplated that the airfoils could have a configuration such that the end portions 82 and the end portions 84 would not be parallel to each other. However even if the end portions were skewed relative to each other, the end portions would be disposed in parallel linear arrays since the airfoils 38 all have the same configuration.

The electrodes 62 which form the trailing edge portions of the airfoils 38 are constructed in the same general manner as are the airfoils 60. However, the airfoils 62 have a configuration which corresponds to the configuration of a trailing edge portion of an airfoil. The electrodes 62 are moved downwardly (as viewed in FIG. 3) to form slots 92 between trailing edge portions 94 of the airfoils 38 and the ribs 46. The slots 92, like the slots 72, extend between the outer or tip end portion 82 of the airfoil and the inner or root end portion 84 of the airfoils.

Although the electrodes 60 for forming the leading end portions of the airfoils could be moved separately or even one at a time to form slots 72, it is preferred to move the electrodes simultaneously downwardly (as viewed in FIG. 3) to form all of the slots 72 simultaneously. In addition, it is preferred to move the electrodes 62 downwardly (as viewed in FIG. 3) with the electrodes 60 so that the slots 92 are formed simultaneously with the slots 72. Of course, the electrodes 60 and 62 could be moved sequentially or separately. In fact, it is contemplated that only one electrodes 60 could be utilized to form all of the leading edge portions of the airfoils and a single electrode 62 could be utilized to form all of the trailing edge portions of the airfoils. It should be understood that electrolyte flows between the leading end portions of the electrodes 62 and 62 and the workpiece 22 as they are moved relative to the workpiece. At this time an electrical potential is maintained between the electrodes and the workpiece with the electrodes being cathodic and the workpiece being anodic.

Although only the electrodes 60 and 62 for forming the leading and trailing edge portions of the series of airfoils 30 has been illustrated in FIG. 3, it should be understood that a similar group of electrodes are utilized to form slots 98 between leading edge portions 100 of the airfoils 38 of the series of airfoils 26 and the associated ribs 46. Similarly, electrodes having a configuration similar to the electrodes 62 are utilized to form slots 104 between trailing edge portions 106 of the airfoils 38 of a series of airfoils 26 and the ribs 46 of the workpiece 22. Since the airfoils 38 of the series of airfoils 26 slope in the opposite direction as the series of airfoils 30, the leading edge portions 100 of the airfoils of the series 26 of the airfoils is disposed to the right as viewed in FIG. 7 while the leading edge portion of the airfoils of the series 30 of airfoils are disposed to the left as viewed in FIG. 7. It should be understood that airfoils having major side surfaces formed by methods which do not include the electrolytic removal of material may advantageously have their leading and trailing edge portions formed by the electrodes 60 and 62.

When the electrodes 60 and 62 are utilized to form the slots 72 and 92, relatively wide slots having a width of approximately 0.25 of an inch are formed. This relatively wide slot may be objectionable under certain conditions. Therefore, it may be preferred to utilize electrodes 107 and 108 (FIG. 4A) or electrodes 109 and 110 (FIG. 4B) to form relatively narrow slots 72 and 92.

The electrodes 107 and 108 (FIG. 4A) have operating end portions 111 formed by longitudinally extending pieces of wire. In one specific instance, the wires forming the leading end portions 111 of electrodes 107 and 108 had a diameter of approximately 0.125 of an inch and were connected with relatively thin sheets of insulated brass having a thickness of approximately 0.0625 of an inch. A pair of electrodes 107 and 108 is provided at the leading and trailing edge portions of each of the airfoils. Of course, the edge portions 111 of the electrodes 107 and 108 are shaped to have a configuration corresponding to the configuration of the leading and trailing edge portions of the airfoils.

The electrodes 107 and 108 moved to positions very close to the airfoil surfaces, in one specific instance they were approximately 0.005 inches away from the airfoil surfaces. A flow of electrolyte is then established between the stationary electrodes and the airfoil surfaces. At the same time, an electrical potential is established between the electrodes 107 and 108 and the airfoil surface. This causes the formation of a relatively thin slot, in one specific instance a slot of 0.010 of an inch was formed at the leading and trailing edge portions of the airfoils. It should be noted that the electrodes 107 and 108 are not moved relative to the workpiece during the electrolytic removal of material from the workpiece.

The electrodes 109 and 110 (FIG. 4B) do not utilize wire to form their leading end portions as do the electrodes 107 and 108. The electrodes 109 and 110 have leading end portions which are formed on sheets of insulated brass. The electrodes 109 and 110 can be moved to a position extremely close to the airfoils and held stationary while an electrical potential is established between the electrodes and the workpiece to thereby effect the formation of relatively small slots in the same manner as previously described in connection with the electrodes 107 and 108. However, if desired, the electrodes 107-110 could be moved relative to the workpiece during the electrolytic removal of material from the workpiece.

Figure 4A:
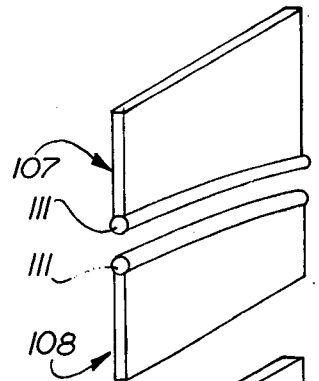
FIGS. 4A and 4B are illustrations of other slot forming electrodes for shaping the leading and trailing edge portions of the airfoils.
Figure 4B:
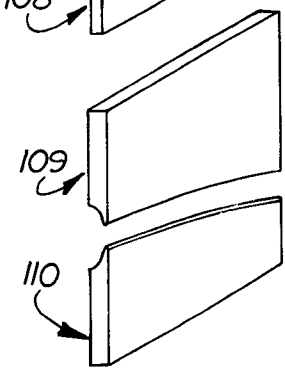

When utilizing the electrodes of FIGS. 4A and 4B, the same machine 20 could be utilized to form both the major side surfaces of the airfoils and the leading and trailing edge portions of the airfoils. However, the leading and trailing edge portions of the airfoils would be formed in a separate operation subsequent to the forming of the major side surfaces since the controlling electrochemical perameters are substantially different for the two operations. It is contemplated that the major side surfaces of the airfoils would be formed utilizing a fixture in which electrodes having configurations correspondng to the major side surfaces of the airfoils would be utilized and that the leading and trailing edge portions of the airfoils will be formed utilizing fixtures having electrodes similar to those disclosed in FIGS. 4A and 4B. Although it is preferred to electrolytically remove material to form the leading and trailing edge portions of the electrodes, it is contemplated that under certain circumstances it may be desired to form the leading and trailing edge portions in another manner, such as by utilizing known cutting tools.

Figure 5:
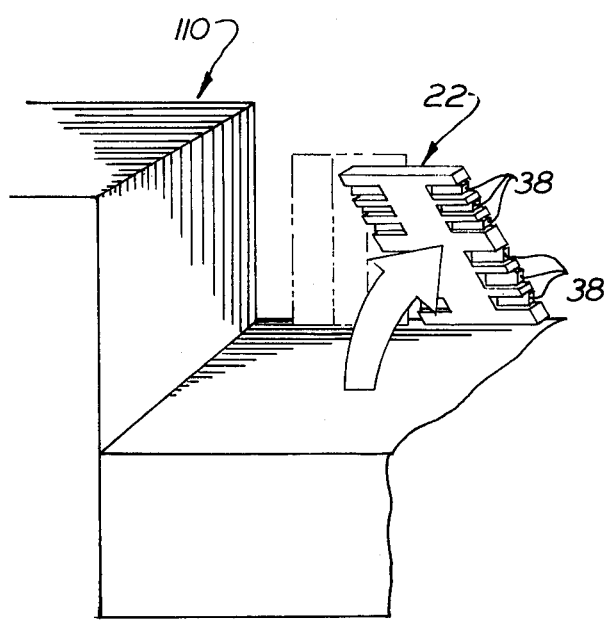
FIG. 5 is a schematic illustration of a work station at which a workpiece is inspected after the major side surfaces and leading and trailing edge portions of the airfoils have been formed.

Although the probability of error in forming the airfoils is very low, after the leading and trailing edge portions of the airfoils have been formed by electrolytically removing material from the workpiece 22, the workpiece is inspected at a station which is illustrated schematically at 113 in FIG. 5. Known surface location sensing devices using linear voltage differential concepts are utilized at the inspection station. It should be noted that at this time the major side surfaces and the leading and trailing edge portions of the airfoils have been formed. Therefore, the airfoils can be inspected to determine if the airfoils have been accurately formed to their final configuration. This inspection occurs immediately after the electrochemical machining operations which form the major side surfaces and leading and trailing edge portions of the airfoils. If defects are formed in the airfoils they can be quickly detected before a large number of airfoils have been made. It is believed that by providing an inspection immediately after the electrochemical machining of the major sides and leading and trailing edge portions of the airfoils, the rapid detection of errors in the electrochemical machining process is facilitated to thereby tend to lessen the number of inaccurately made airfoils and the amount of scrap. It should be understood that once the machine 20 has been properly set up to form the airfoils, the reliability of the process was so great that only about one out of a hundred workpieces will have to be inspected.

Once the airfoils have been inspected and found to be of a suitable configuration, bases are formed in association with the airfoils to support them. In the present instance it is contemplated that the airfoils will be utilized as turbine blades and therefore a base is formed at only one end of the airfoil. However, it is contemplated that the present invention could be utilized in the manufacture of airfoils which have bases at both ends to enable them to be mounted and utilized is association with radially inner and outer support structures. It is also contemplated that airfoils which are not provided with bases could be manufactured by the method set forth herein.

Figure 6:
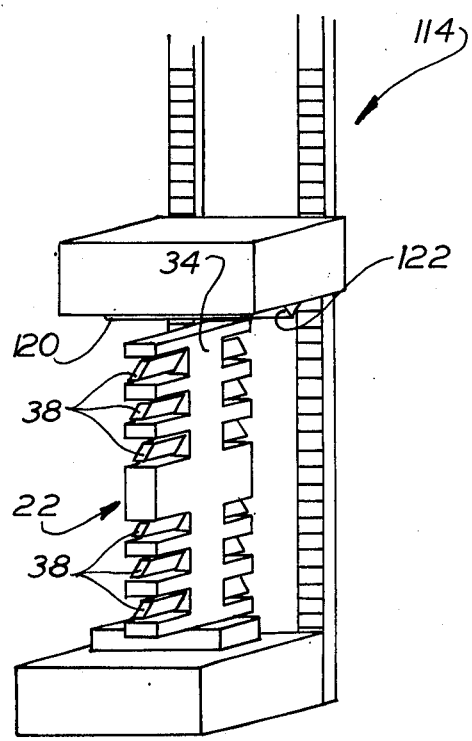
FIG. 6 is a schematic illustration of a work station at which cutting tools are utilized to initiate the forming of a plurality of bases in association with the airfoils by forming grooves in the workpiece.
Figure 7:
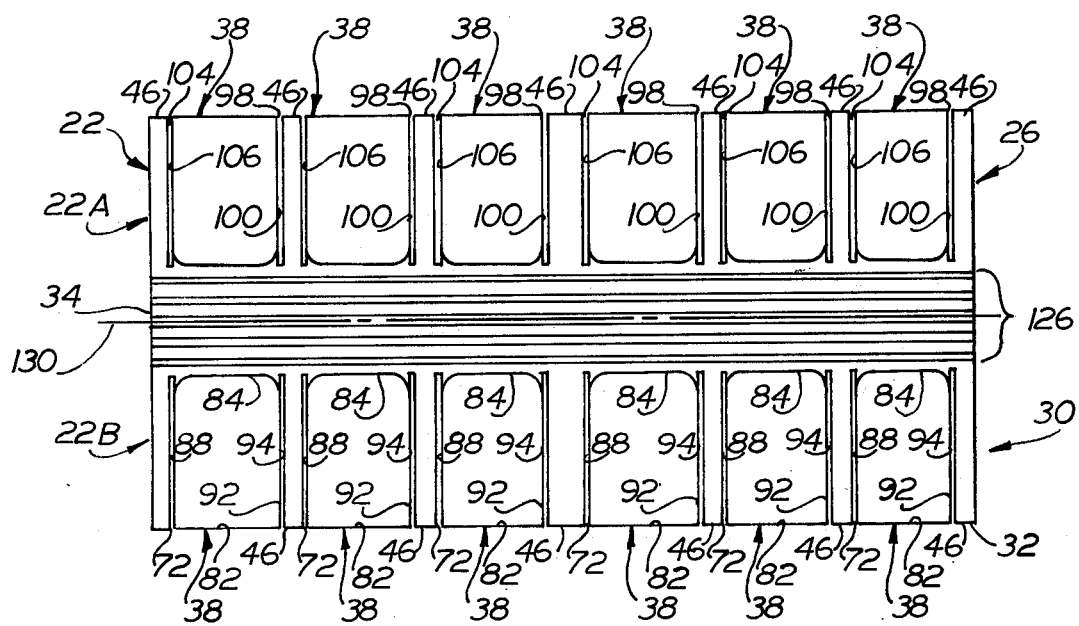
FIG. 7 is a plan view illustrating the workpiece of FIG. 2 after the leading and trailing edge portions of the airfoils have been formed in the manner depicted in FIG. 3 and after a plurality of longitudinally extending grooves have been formed in the workpiece by cutting tools at the work station illustrated in FIG. 6.
Figure 8:
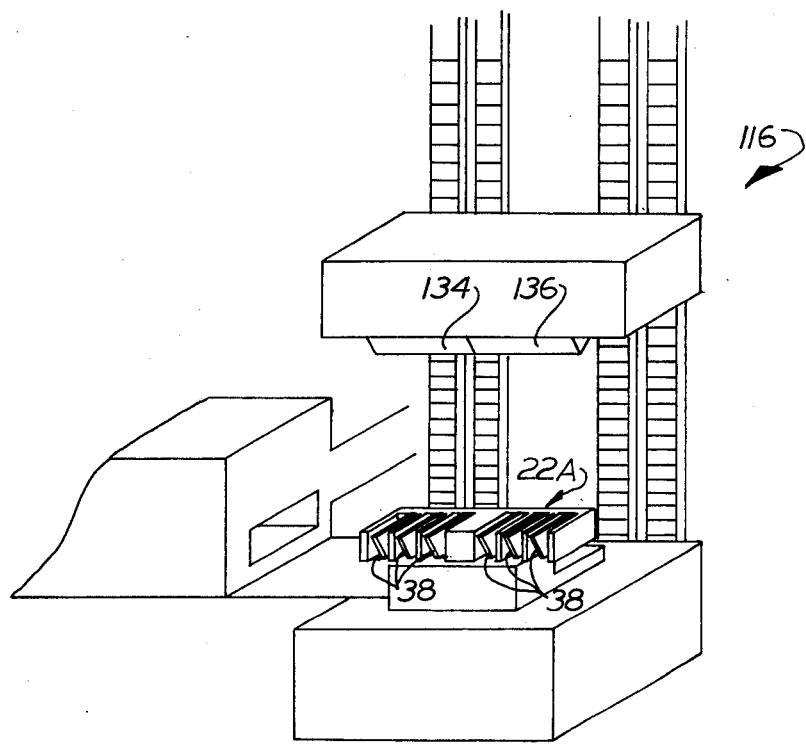
FIG. 8 is a schematic illustration of a work station at which the formation of the various bases is completed and the airfoils and bases are separated from each other after the series of airfoils along one edge portion of the workpiece of FIG. 7 have been separated from the airfoils along the other edge portion of the workpiece.

In order to form a base in association with each of the airfoils 38, a plurality of cutting machines 114 (FIG. 6) and 116 (FIG. 8) are utilized to shape the central portion 34 (FIG. 2) of the workpiece 22. The cutting machine 114 includes a pair of cutting tools which are indicated schematically at 120 and 122 in FIG. 6. The cutting tools 120 and 122 are moved vertically downwardly (as viewed in FIG. 6) along opposite major side surfaces of the workpiece 22 to simultaneously form a plurality of parallel grooves indicated at 126 in FIG. 7. The grooves 126 extend lengthwise of the central portion 34 of the workpiece in a parallel relationship with a central axis 130 of the workpiece 22. Although only the grooves 126 in one side of the workpiece are shown in FIG. 7, similar grooves are formed in the opposite side of the workpiece in alignment with the grooves 126.

The number of grooves 126 formed on each side of the central portion of the workpiece 22 is determined by the shape of the base of the airfoil. The more locking or retaining projections formed on the base of the airfoil, the greater is the number of grooves 126 formed in the central portion of the workpiece. Of course, the central portion 34 of the workpiece is sized so as to have a distance between the two series 26 and 30 of airfoils corresponding to a distance which is slightly greater than twice the axial depth of the bases to be associated with the airfoils.

Although it is preferred to utilize either a vertical or horizontal broaching machine having a plurality of broaches to simultaneously form the grooves 126 is opposite sides of the workpiece 22, it is contemplated that the machine 20 could, if desired, utilize other types of cutting tools to either mill or grind the grooves 126 in the opposite sides of the workpiece 22. It should also be understood that although it is preferred to simultaneously cut the grooves in both sides of the workpiece, they could be sequentially cut in the opposite sides of the workpiece with a single tool or a plurality of tools.

Once the longitudinally extending grooves 126 have been formed in opposite sides of the workpiece 22 between the two series of airfoils 26 and 30, the workpiece 22 is separated along its central axis 130 to form the workpiece into two separate sections having the same identical configuration. It is contemplated that the workpiece could be separated by broaching the central portion of the workpiece until it is very thin. The two series 26 and 30 of airfoils would then be broken apart along the central axis 130. However, the two series of airfoils could be separated by cutting the centre of the workpiece with a suitable tool at the cutting machine 114. At the present time it is preferred to broach the opposite sides of the workpiece 22 to form a very thin connecting section between the two series 26 and 30 of airfoils. This connecting section is the readily broken to separate the two series 26 and 30 of airfoils.

Figure 9:
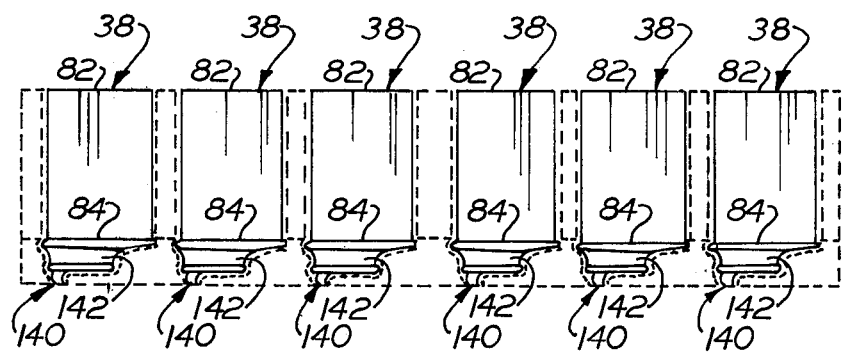
FIG. 9 is a schematic illustration depicting the manner in which material is removed from the workpiece at the work station of FIG. 8 to separate the airfoils and complete the formation of their associated bases.

After the two series 26 and 30 of airfoils have been separated, the workpiece 22 is divided into two separate parts, that is a part designated by the numeral 22a in FIG. 7 including the series 26 of airfoils and in part 22b having a configuration which is identical to that of the workpiece 22a and includes the series 30 of airfoils. Each of the workpiece parts 22a and 22b are moved in turn to a cutting machine illustrated shcematically at 116 in FIG. 8. The cutting machine 116 finishes the formation of the roots of the airfoils by utilizing a plurality of cutting tools indicated schematically at 134 and 136 in FIG. 8. The tools 134 and 136 are moved vertically downwardly in a direction perpendicular to the grooves 126 to shape the bases 140 (FIG. 9). Although the cutting machine 116 is preferably either a horizontal or vertical broaching machine, it is contemplated that the bases 140 of the airfoils 38 could be formed utilizing either a milling machine or a grinding machine.

The cutting machine 116 shapes the bases 140 in association with each of the airfoils 38 in the series 26 of airfoils by removing the rib portions 46 of the workpiece 22a and by removing the portion of the grooved central area 34 which is unnecessary to form the bases 140. The material which is removed by the cutting machine 116 has been indicated schematically in dashed lines in FIG. 9. It should be noted that each of the bases 140 has a groove 142 corresponding to one of the grooves 126 formed in the central portion 34 of the workpiece 22 (see FIGS. 7 and 9). In addition, the bases 140 are provided with suitable locking teeth to engage similar teeth in a base to hold the airfoils 38 against axially outward movement. Although only a single base 140 has been illustrated in association with the root end portions 84 of the airfoils 38, it is contemplated that a mounting base could be provided in association with the outer or tip end portions 82 of the airfoils 38.

The airfoils 38 are formed with a high degree of accuracy by utilizing the same surfaces on the workpiece 22 to locate the workpiece relative to the electrodes in the ECM apparatus 20, the slot forming electrodes 60 and 62, and the cutting tools in the machines 114 and 116. Generally speaking, these reference surfaces are the major and minor side surfaces of the workpiece 22. By utilizing the same surfaces to locate the workpiece 22 for each of the plurality of operations, the airfoils and their bases are accurately formed to desired configurations.

Prior to forming the major sides 40 and 42 of the airfoils 38 in the apparatus 20, the major side surfaces at the central portion 34 of the workpiece are utilized to accurately position the workpiece. In addition, a minor side surface 146 (see FIG. 2) at one end of the workpiece is utilized to position the workpiece and a minor side surface 148 formed at the ribs 46 is engaged to position the workpiece in the ECM apparatus 20. These same side surfaces are engaged to locate the workpiece relative to the cutting machine 114. However, it should be noted that during operation of the cutting machine 114 the removal of material to form the grooves 126 requires that the major side surface of the workpiece be engaged along the ribs 46 to position the workpiece. The two minor side surfaces 146 and 148 are also engaged to position the workpiece relative to the machine 114. After the workpiece 22 has been separated into two halves 22a and 22b, the major side surface remaining on the ribs 46 is utilized to position the workpiece and the common end surface 146 is utilized. However, the surface 148 can be utilized to position only the workpiece 22b, therefore the workpiece 22a is positioned by the minor side surface opposite from the minor side surface 148.

Figure 10:
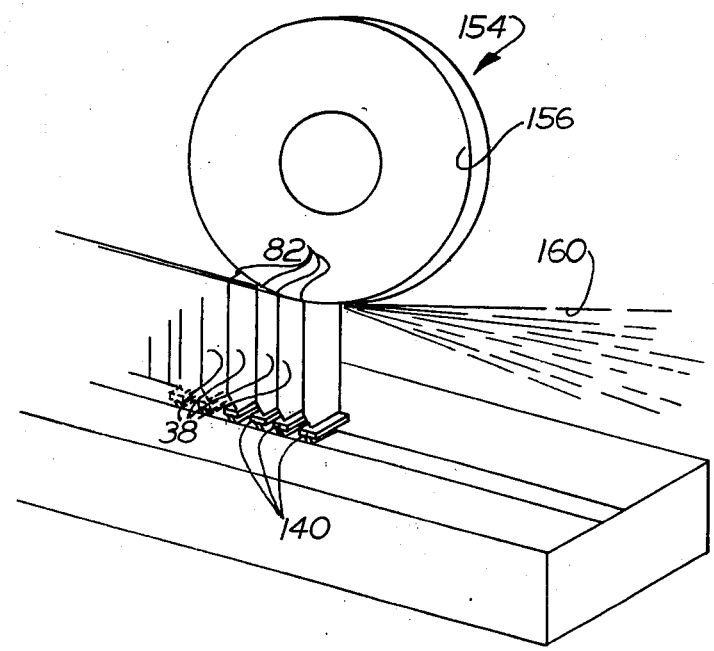
FIG. 10 is a schematic illustration of a work station at which tip end portions of the airfoils are formed.

After the airfoils 38 and associated bases 140 have been formed, the tips or outer ends 82 of the airfoils are formed to a desired configuration. This is accomplished by electrochemical grinding apparatus 154 (see FIG. 10). Each of the airfoils 38 is moved in turn passed a rotating electrode 156. As the airfoils are moved passed the electrode 156, electrolyte, illustrated schematically at 160, flows between the outer or tip end 82 of the airfoils 38 and the electrode. At this time there is an electrical potential established between the airfoils 38 and the electrode 156 with the electrode being cathodic and the airfoils being anodic. This results in the electrolytic removal of material from the tip end portions of the airfoils 38 to accurately form the tip end portions to a desired configuration. Although it is preferred to shape the tip end portions of the airfoils 38 with an electrochemical grinding operation, it is contemplated that other types of equipment could be utilized to accurately form the tip ends of the airfoils.

Once the airfoils 38 and their associated bases 140 have been accurately formed, they are electrochemically deburred and then subjected to a final insepction. The manner in which this is done is well known to those skilled in the art and will not be described herein to avoid prolixity of description.

In view of the foregoing description it is apparent that the present invention provides an improved method of forming articles, such as the airfoils 38 and bases 140. Although major side surfaces 40 and 42 of the airfoils or other articles could be formed in many different ways, the apparatus disclosed in U.S. patent application Ser. No. 681,779, filed Apr. 30, 1976 by Gustav E. Schrader and entitled "Apparatus for Electrochemically Forming a Plurality of Articles" may advantageously be utilized to electrolytically remove material from a workpiece 22 to form the major side surfaces 40 and 42 of a first series 26 of airfoils 38 along one edge portion 28 of the workpiece 22 and to form the major side surfaces 40 and 42 of a second series 30 of airfoils 38 along the opposite edge portion 32 of the workpiece 22.

In accordance with one of the features of the present invention, leading and trailing edge portions 88, 94, 100 and 106 of each of the airfoils 38 are formed by making slots 72, 92, 98 and 104 between the major side surfaces of the airfoils and the remainder of the workpiece. Although conventional cutting tools could be utilized, the slots are advantageously formed by electrolytically removing material from the workpiece. This is accomplished by utilizing either the electrodes 60 and 62 of FIG. 4, the electrodes 107 and 108 of FIG. 4A, or the electrodes 109 and 110 of FIG. 4B.

Bases 140 for supporting the airfoils 38 of each of the two series 26 and 30 of airfoils may be formed adjacent to end portions of the airfoils by utilizing cutting tools. A pair of cutting tools 120 and 122 are advantageously moved along opposite sides of the workpiece 22 to form a plurality of grooves 126 between the two series 26 and 30 of airfoils 38. The grooves 126 have a shape corresponding to the shape of base surfaces which extend transversely to the leading and trailing edges of the airfoils. The two series 26 and 30 of airfoils 38 are then separated from each other and cutting tools 134 and 136 are utilized to separate the various airfoils from each other and to complete the formation of the bases 140 of the airfoils.

Having described specific preferred embodiments of the invention, the following is claimed:

1. A method of at least partially forming a plurality of articles, said method comprising the steps of partially forming a first series of articles in a first longitudinally extending array adjacent to a first edge portion of a workpiece by electrolytically removing material from the workpiece, partially forming a second series of articles in a second longitudinally extending array adjacent to a second edge portion of the workpiece which is opposite from the first edge portion of the workpiece by electrolytically removing material from the workpiece, the first and second longitudinally extending arrays of articles being separated from each other by a longitudinally extending central portion of the workpiece, said steps of partially forming the first and second series of articles including the steps of effecting relative movement between an electrode and the workpiece, establishing a flow of electrolyte between the workpiece and the electrode during the relative movement between the electrode and the workpiece, and establishing an electrical potential between the electrode and the workpiece during the flow of electrolyte between the electrode and the workpiece, said method further comprising the steps of separating the first series of articles from the second series of articles at the longitudinally extending central portion of the workpiece after performing said steps of partially forming the first and second series of articles, and further forming the first and second series of articles after performing said step of separating the first series of articles from the second series of articles, said step of further forming the first and second series of articles includes the step of utilizing the central portion of the workpiece to form a portion of each of the articles.

2. A method as set forth in claim 1 wherein said step of effecting relative movement between an electrode and the workpiece includes effecting movement between the workpiece and an electrode having a relatively long narrow end portion, said step of flowing electrolyte between the workpiece and the electrode includes flowing electrolyte between the long narrow end portion of the electrode and the workpiece to effect the formation of a slot in the workpiece.

3. A method as set forth in claim 1 wherein said step of effecting relative movement between an electrode and the workpiece includes effecting movement between the workpiece and an electrode having a plurality of spaced apart surfaces, said step of flowing electrolyte between the workpiece and the electrode including flowing electrolyte between each of the spaced apart surfaces of the electrode and the workpiece to effect the electrolytic removal of material at a plurality of spaced apart locations to at least partially form a plurality of articles.

4. A method as set forth in claim 3 wherein each of said spaced apart surfaces of the electrode has a configuration corresponding to the configuration of a major side surface of an article.

5. A method as set forth in claim 1 further including the step of further forming the first and second series of articles by cutting away material from the central portion of the workpiece prior to performing said step of separating the first series of articles from the second series of articles.

6. A method as set forth in claim 1 further including the step of locating the workpiece in a first predetermined position prior to performing said steps of partially forming the first and second series of articles by engaging a plurality of reference surfaces on the workpiece, and locating the workpiece in a second predetermined position prior to performing said step of further forming the first and second series of articles by engaging at least some of the same reference surfaces as were engaged to locate the workpiece in the first predetermined position.

7. A method as set forth in claim 1 wherein said step of further forming the first and second series of articles includes the steps of separating each of the articles of the first series of articles from each other and separating each of the articles of the second series of articles from each other.

8. A method as set forth in claim 1 further including the step of moving a first cutting tool along a first side of the central portion of the workpiece and moving a second cutting tool along a second side of the central portion of the workpiece to further form both the first and second series of articles prior to performing said step of separating the first series of articles from the second series of articles.

9. A method as set forth in claim 1 further including the steps of moving a first cutting tool along a first side of the central portion of the workpiece and simultaneously therewith moving a second cutting tool along a second side of the central portion of the workpiece to further form both the first and second series of articles prior to performing said step of separating the first series of articles from the second series of articles, said steps of moving the first and second cutting tools along the first and second sides of the central portion of the workpiece including moving the cutting tools along parallel paths through a distance which is at least as great as the length of the longitudinally extending central portion of the workpiece.

10. A method of at least partially forming from a workpiece a plurality of airfoils having opposing major sides and leading and trailing edge portions interconnected by opposite end portions and of at least partially forming from the same workpiece a plurality of bases each of which is disposed at an end portion of an airfoil for use in supporting the airfoil, said method comprising the steps of at least partially forming the opposing major sides of the plurality of airfoils at spaced apart locations in the workpiece with the opposite end portions of the airfoils disposed in a pair of spaced apart and generally parallel linear arrays, said step of at least partially forming the opposing major sides of the airfoils being performed with the airfoils interconnected by a portion of the workpiece disposed adjacent to the airfoil end portions disposed in one of the linear arrays, at least partially forming a plurality of bases adjacent to the airfoil end portions disposed in said one of the linear arrays by moving at least one cutting tool along a path extending parallel to the one linear array of airfoil end portions to remove material from the portion of the workpiece disposed adjacent to the airfoil end portions in said one of the linear arrays, said step of moving at least one cutting tool along a path including the step of moving the cutting tool along the path past each of the airfoil end portions in the one linear array of airfoil end portions to at least partially form a base in association with each airfoil while the airfoils are interconnected by the portion of the workpiece disposed adjacent to the airfoil end portions, and separating the airfoils from each other having performed said step of moving a cutting tool along a path extending parallel to one linear array of airfoil end portions.

11. A method as set forth in claim 10 further including the step of at least partially forming the leading and trailing edge portions of the airfoils by forming in the workpiece a pair of slots in association with each of the airfoils, said step of forming slots includes the steps of establishing a flow of electrolyte between the workpiece and an electrode, and establishing an electrical potential between the electrode and the workpiece during the flow of electrolyte between the electrode and the workpiece.

12. A method as set forth in claim 10 wherein said step of moving at least one cutting tool along a path includes the step of forming in the workpiece a plurality of longitudinally extending grooves having a length which is at least as great as the length of the one linear array of airfoil end portions.

13. A method as set forth in claim 10 further including the step of further forming the plurality of bases adjacent to the end airfoil portions disposed in the one linear array of airfoil end portions by moving at least one cutting tool along a path extending transversely to the one linear array of airfoil end portions to remove material from between adjacent bases.

14. A method as set forth in claim 11 wherein said step of forming a plurality of slots includes the step of forming a plurality of slots each of which extends inwardly from one edge portion of the workpiece to a location adjacent to a base.

15. A method as set forth in claim 10 wherein said step of at least partially forming a plurality of bases further includes the step of moving a second cutting tool along a path extending parallel to the one linear array of airfoil end portions and disposed on a side of the workpiece opposite from a side of the workpiece on which the path of movement of the one cutting tool is disposed to thereby effect the removal of material from opposite sides of the workpiece.

16. A method of at least partially forming an airfoil having opposing major sides with leading and trailing edge portions, said method comprising the steps of at least partially forming the opposing major sides of the airfoil in a workpiece with the opposing major sides connected with the remainder of the workpiece in areas where the leading and trailing edge portions of the airfoil are to be formed, said step of forming the opposing major sides of the airfoil includes the steps of effecting relative movement between the workpiece and a plurality of side forming electrodes having end portions with configurations corresponding to the configurations of the major sides of the airfoil, establishing a flow of electrolyte between the workpiece and the end portions of the side forming electrodes, and establishing an electrical potential between the side forming electrodes and the workpiece during the flow of electrolyte between the workpiece and the end portions of the side forming electrodes to effect the electrolytic removal of material from the workpiece, and after performing said step of at least partially forming the opposing major sides of the airfoil, at least partially forming the leading and trailing edge portions of the airfoil by forming slots between the leading and trailing portions of the airfoil and a remaining portion of the workpiece which was substantially uneffected by said side forming electrodes, said step of forming slots including the steps of providing a slot forming electrode which is separate from the side forming electrodes and has an elongated end portion with a configuration corresponding to the configuration of one of the slots, establishing a flow of electrolyte between the workpiece and the elongated end portion of the slot forming electrode, and establishing an electrical potential between the slot forming electrode and the workpiece during the flow of electrolyte between the workpiece and the end portion of the slot forming electrode to effect the electrolytic removal of material from the workpiece.

17. A method as set forth in claim 16 further including the step of forming a base in association with the airfoil by utilizing a plurality of cutting tools to cut away material from the workpiece adjacent to one end portion of the airfoil.

18. A method of at least partially forming a plurality of airfoils having opposing major sides and leading and trailing edge portions interconnected by opposite end portions and of at least partially forming a plurality of bases each of which is disposed at an end portion of an airfoil for use in supporting the airfoil, said method comprising the steps of at least partially forming the major sides of a first series of airfols at spaced apart locations adjacent to a first edge portion of a workpiece, at least partially forming the major sides of a second series of airfoils at spaced apart locations adjacent to a second edge portion of the workpiece opposite from the first edge portion of the workpiece, said steps of at least partially forming the major sides of the first and second series of airfoils including the steps of leaving areas connected with the remainder of the workpiece where leading and trailing edge portions of the airfoils are to be formed, at least partially forming the leading and trailing edge portions of the first series of airfoils by forming a plurality of slots in the areas where the major sides of the first series of airfoils are connected with a remaining portion of the workpiece, at least partially forming the leading and trailing edge portions of the second series of airfoils by forming a plurality of slots in the areas where the major sides of the second series of airfoils are connected with a remaining portion of the workpiece, at least partially forming the plurality of bases in association with the major sides of the first and second series of airfoils by utilizing at least one cutting tool to remove workpiece material, separating the first series of airfoils from the second series of airfoils with the airfoils of the first series of airfoils interconnected and with the airfoils of the second series of airfoils interconnected, separating the airfoils of the first series and their associated bases from each other, and separating the airfoils of the second series and their associated bases from each other, said steps of separating the airfoils of the first and second series of airfoils being performed after performing said step of partially forming the plurality of bases by utilizing a cutting tool.

19. A method as set forth in claim 18 wherein said step of at least partially forming the plurality of bases includes the steps of moving at least the one cutting tool along one side of the workpiece to form a first plurality of longitudinally extending grooves in the one side of the workpiece and moving a second cutting tool along a side of the workpiece opposite from the one side to form a second plurality of longitudinally extending grooves in the opposite side of the workpiece.

20. A method as set forth in claim 19 wherein said step of at least partially forming the bases further includes the step of moving at least one cutting tool along a path extending transversely to the longitudinal axes of the grooves in the sides of the workpiece.

21. A method as set forth in claim 18 wherein said step of at least partially forming the major sides of a first series of airfoils is performed simultaneously with said step of at least partially forming the major sides of a second series of airfoils.

22. A method as set forth in claim 18 wherein said step of at least partially forming the leading and trailing edge portions of the first series of airfoils is performed simultaneously with said step of at least partially forming the leading and trailing edge portions of the second series of airfoils.

23. A method as set forth in claim 18 wherein said steps of at least partially forming the leading and trailing edge portions of the first and second series of airfoils include the steps of providing a plurality of electrodes each of which has an elongated end portion with a configuration of an edge portion of an airfoil, establishing a flow of electrolyte between the workpiece and the elongated end portions of the plurality of electrodes, and establishing an electrical potential between the plurality of electrodes and the workpiece to effect the electrolytic removal of material from the workpiece.

24. A method as set forth in claim 18 wherein said steps of at least partially forming the major sides of the first and second series of airfoils includes the steps of effecting relative movement between a plurality of electrodes and the workpiece, establishing a flow of electrolyte between the workpiece and the plurality of electrodes during the relative movement between the workpiece and the plurality of electrodes, and establishing an electrical potential between the plurality of electrodes and the workpiece during the flow of electrolyte between the plurality of electrodes and the workpiece.

25. A method of at least partially forming from a workpiece a plurality of airfoils having opposing major sides and leading and trailing edge portions and of at least partially forming from the same workpiece a plurality of bases each of which is disposed at an end portion of an airfoil, said method comprising the steps of at least partially forming the opposing sides of a first series of airfoils at spaced apart locations along a first edge portion of the workpiece, at least partially forming the opposing sides of a second series of airfoils at spaced apart locations along a second edge portion of the workpiece which is opposite from the first edge portion of the workpiece, the first and second series of airfoils being interconnected by a longitudinally extending central portion of the workpiece disposed between the first and second series of airfoils, partially forming a first plurality of bases adjacent to the first series of airfoils and partially forming a second plurality of bases adjacent to the second series of airfoils by moving a cutting tool along one side of the central portion of the workpiece past each of the airfoils of the first and second series of airfoils and moving a cutting tool along a side opposite the one side of the central portion of the workpiece past each of the airfoils of the first and second series of airfoils to cut material away from both sides of the central portion of the workpiece, separating the airfoils of the first series of airfoils from each other after having performed said step of partially forming said first and second pluralities of bases, and separating the airfoils of the second series of airfoils from each other after having performed said step of partially forming said first and second pluralities of bases.

26. A method as set forth in claim 25 wherein said steps of moving a cutting tool along the one side of the workpiece and moving a cutting tool along the opposite side of the workpiece includes the steps of simultaneously moving first and second cutting tools along the opposite sides of the central portion of the workpiece.

27. A method as set forth in claim 25 wherein said steps of forming the opposing major sides of the first and second series of airfoils includes the steps of effecting relative movement between the workpiece and a plurality of side forming electrodes having end portions with configurations corresponding to the configurations of the major side surface areas of the airfoils of the first and second series of airfoils, establishing a flow of electrolyte between the workpiece and the end portions of the side forming electrodes, and establishing an electrical potential between the side forming electrodes and the workpiece during the flow of electrolyte between the workpiece and the end portions of the side forming electrodes to effect the electrolytic removal of material from the workpiece to simultaneously form opposing major side surface areas of the airfoils of the first and second series of airfoils.

28. A method as set forth in claim 27 wherein said steps of forming the opposing major sides of the first and second series of airfoils includes the step of forming slots between the leading and trailing edge portions of the airfoils of the first and second series of airfoils and a remaining portion of the workpiece which was substantially uneffected by said side forming electrodes, said step of forming slots including the steps of providing a slot forming electrode which is separate from the side forming electrodes and has an elongated end portion with a configuration corresponding to the configuration of one of the slots, establishing a flow of electrolyte between the workpiece and the elongated end portion of the slot forming electrode, and establishing an electrical potential between the slot forming electrode and the workpiece during the flow of electrolyte between the workpiece and the end portion of the slot forming electrode to effect the electrolytic removal of material from the workpiece.

* * * * *

UNITED STATES PATENT AND TRADEMARK OFFICE
CERTIFICATE OF CORRECTION

PATENT NO. : 4,057,475
DATED : November 8, 1977
INVENTOR(S) : Gustav E. Schrader It is certified that error appears in the above-identified patent and that said Letters Patent are hereby corrected as shown below:

Column 13, line 41, after "other" insert --after--.

Column 15, line 58 after "configuration" add
-- corresponding to the configuration --.

Signed and Sealed this

Eighteenth Day of April 1978

[SEAL]

Attest:

RUTH C. MASON
Attesting Officer

LUTRELLE F. PARKER
Acting Commissioner of Patents and Trademarks